(12) United States Patent
Miyake et al.

(10) Patent No.: US 10,014,749 B2
(45) Date of Patent: Jul. 3, 2018

(54) FLUID ELECTRICITY GENERATION DEVICE WITH DUAL-CASE

(71) Applicants: Kunihiro Miyake, Sizuoka (JP); Nariie Omori, Kanagawa-Ken (JP); Mitsushin Co., Ltd., Kanagawa-Ken (JP)

(72) Inventors: Kunihiro Miyake, Sizuoka (JP); Nariie Omori, Kanagawa-Ken (JP)

(73) Assignees: Kunihiro Miyake, Sizuoka (JP); Nariie Omori, Kanagawa-Ken (JP); MITSUSHIN CO., LTD., Kanagawa-Ken (JP)

( * ) Notice: Subject to any disclaimer, the term of this patent is extended or adjusted under 35 U.S.C. 154(b) by 32 days.

(21) Appl. No.: 15/249,824

(22) Filed: Aug. 29, 2016

(65) Prior Publication Data
US 2017/0194836 A1 Jul. 6, 2017

(30) Foreign Application Priority Data
Jan. 5, 2016 (TW) .............................. 105100135 A

(51) Int. Cl.
| | |
|---|---|
| H02K 1/12 | (2006.01) |
| H02K 1/27 | (2006.01) |
| H02K 1/18 | (2006.01) |
| F03D 9/00 | (2016.01) |
| F03D 9/25 | (2016.01) |
| H02K 7/18 | (2006.01) |

(52) U.S. Cl.
CPC .......... *H02K 7/1823* (2013.01); *F03D 9/002* (2013.01); *F03D 9/25* (2016.05); *H02K 1/12* (2013.01); *H02K 1/274* (2013.01)

(58) Field of Classification Search
CPC ......... Y02E 10/28; Y02E 10/22; F03B 17/061
USPC ....................................... 290/54, 43
See application file for complete search history.

(56) References Cited

U.S. PATENT DOCUMENTS

| | | | | |
|---|---|---|---|---|
| 622,474 | A * | 4/1899 | Hoskins John | ........... F04D 3/02 290/52 |
| 1,071,748 | A * | 9/1913 | Ingison | ................. F03B 17/063 24/570 |
| 3,413,504 | A * | 11/1968 | Baker | .................... H02K 44/06 310/11 |

(Continued)

FOREIGN PATENT DOCUMENTS

| | | |
|---|---|---|
| TW | 215937 | 11/1993 |
| TW | M511544 | 11/2015 |

*Primary Examiner* — Tulsidas C Patel
*Assistant Examiner* — Charles Reid, Jr.
(74) *Attorney, Agent, or Firm* — Li & Cai Intellectual Property (USA) Office

(57) ABSTRACT

A fluid electricity generation device with dual-case includes a stator assembly and a rotor assembly arranged in the stator assembly. The stator assembly includes an outer case and at least one magnetically permeable unit disposed on the outer case. The rotor assembly includes a rotating member and at least one magnetic module. The rotating member has an inner case, a column arranged in the inner case, and a spiral blade connected to the column. The rotating member is rotatable with respect to the outer case. The first magnetic module is disposed on the inner case and has a magnetic area. The spiral blade is configured to be driven to rotate the rotor assembly by utilizing fluid, such that the magnetic area can pass through the magnetically permeable unit for generating induced current.

7 Claims, 15 Drawing Sheets

(56) References Cited

U.S. PATENT DOCUMENTS

| | | | | |
|---|---|---|---|---|
| 4,317,330 A * | 3/1982 | Brankovics | F03B 17/061 | 290/54 |
| 4,424,451 A * | 1/1984 | Schmidt | F03B 17/065 | 290/54 |
| 4,720,640 A * | 1/1988 | Anderson | F03B 13/083 | 290/43 |
| 5,209,650 A * | 5/1993 | Lemieux | F01D 15/10 | 384/115 |
| 5,394,016 A * | 2/1995 | Hickey | F03B 3/12 | 290/1 R |
| 6,011,334 A * | 1/2000 | Roland | H02K 7/11 | 290/43 |
| 6,841,892 B1 * | 1/2005 | Le Nabour | F03D 1/04 | 290/43 |
| 6,849,965 B2 * | 2/2005 | Le Nabour | F03D 1/04 | 290/54 |
| 6,856,036 B2 * | 2/2005 | Belinsky | F03B 17/063 | 290/42 |
| 7,633,174 B1 * | 12/2009 | Feiler | F03B 17/061 | 290/43 |
| 8,569,905 B2 * | 10/2013 | Boyd-Wilson | F03D 3/061 | 290/54 |
| 2001/0009645 A1 * | 7/2001 | Noda | F04D 3/02 | 417/355 |
| 2008/0022920 A1 * | 1/2008 | Custodis | F03B 13/00 | 116/202 |
| 2008/0088135 A1 * | 4/2008 | Novo Vidal | F03B 13/083 | 290/54 |
| 2008/0203729 A1 * | 8/2008 | Zajchowski | F03B 17/063 | 290/43 |
| 2009/0022597 A1 * | 1/2009 | Bowie | F03B 17/061 | 416/223 R |
| 2010/0133937 A1 * | 6/2010 | Nair | H02K 7/06 | 310/154.02 |
| 2010/0194113 A1 * | 8/2010 | Zajchowski | F03B 17/063 | 290/54 |
| 2010/0194117 A1 * | 8/2010 | Pabon | H02K 35/02 | 290/1 R |
| 2010/0231066 A1 * | 9/2010 | Korner | H02K 1/32 | 310/61 |
| 2010/0253091 A1 * | 10/2010 | Tseng | H02K 53/00 | 290/1 R |
| 2011/0049906 A1 * | 3/2011 | Hughes | F03G 7/08 | 290/1 C |
| 2011/0254276 A1 * | 10/2011 | Anderson, Jr. | F03B 17/061 | 290/54 |
| 2012/0007364 A1 * | 1/2012 | David | F03B 13/10 | 290/54 |
| 2012/0038169 A1 * | 2/2012 | Azanza Ladron | H02K 1/278 | 290/55 |
| 2012/0070293 A1 * | 3/2012 | Cwiertnia | F03D 3/002 | 416/176 |
| 2012/0187685 A1 * | 7/2012 | Amin | F03D 3/00 | 290/50 |
| 2013/0209292 A1 * | 8/2013 | Baykut | F04D 3/00 | 417/420 |
| 2016/0254727 A1 * | 9/2016 | Liao | F03G 7/08 | 290/1 A |
| 2017/0194836 A1 * | 7/2017 | Miyake | H02K 7/1823 | |

* cited by examiner

FLUID ELECTRICITY GENERATION DEVICE WITH DUAL-CASE

BACKGROUND OF THE INVENTION

1. Field of the Invention

The instant invention relates to an electricity generation device; in particular, to a fluid electricity generation device with dual-case and a rotor assembly thereof.

2. Description of Related Art

The conventional fluid electricity generation device is provided to generate energy by utilizing fluid to rotate the blade. For example, energy generated from the conventional wind electricity generation device depends on a swept area of the blade, so the conventional wind electricity generation device is provided with large blades for increasing the swept area, but when wind blows the large blades of the conventional wind electricity generation device, the conventional wind electricity generation device does not have a good efficiency of electricity generation. Accordingly, a fluid electricity generation device provided for generating more energy by using a limited fluid force is an important topic in the fluid electricity generation field.

SUMMARY OF THE INVENTION

The instant disclosure provides a fluid electricity generation device with dual-case and a rotor assembly thereof for effectively improving the problem generated from the conventional fluid electricity generation device.

The instant disclosure provides a fluid electricity generation device, comprising: a stator assembly, comprising: an outer case, wherein the outer case surroundingly defines a channel, and the outer case defines an axis passing through the channel; and a magnetically permeable module having at least one magnetically permeable unit disposed on the outer case; and a rotor assembly rotatably arranged in the channel of the outer case, comprising: a rotating member disposed in the channel of the outer case, wherein the rotating member has an inner case, a column arranged in the inner case, and a spiral blade connected to an outer surface of the column, wherein the inner case, the column, and the spiral blade are together rotatable along the axis; and at least one magnetic module disposed on the inner case and having a magnetic area, wherein the spiral blade is configured to be driven by utilizing fluid to rotate the rotor assembly, so that the magnetic area of the magnetic module passes through the magnetically permeable unit to generate induced current.

The instant disclosure also provides a rotor assembly of a fluid electricity generation device, comprising: a rotating member having an inner case, a column arranged in the inner case, and a spiral blade connected to an outer surface of the column at a helix angle of 21~155 degrees, wherein the spiral blade is configured to be driven to rotate the rotating member by utilizing fluid; and at least one magnetic module disposed on the inner case and having a magnetic area.

In summary, the fluid electricity generation device of the instant disclosure can increase the amount of the electricity generation by having the inner case to carry the magnetic module, which is cooperated with the corresponding magnetically permeable unit to generate induced current when the rotor assembly rotates with respect to the stator assembly.

In order to further appreciate the characteristics and technical contents of the instant invention, references are hereunder made to the detailed descriptions and appended drawings in connection with the instant invention. However, the appended drawings are merely shown for exemplary purposes, rather than being used to restrict the scope of the instant invention.

DETAILED DESCRIPTION OF THE PREFERRED EMBODIMENTS

Please refer to FIGS. 1 through 15, which show an embodiment of the instant disclosure. References are hereunder made to the detailed descriptions and appended drawings in connection with the instant invention. However, the appended drawings are merely shown for exemplary purposes, rather than being used to restrict the scope of the instant invention.

Figure 1:
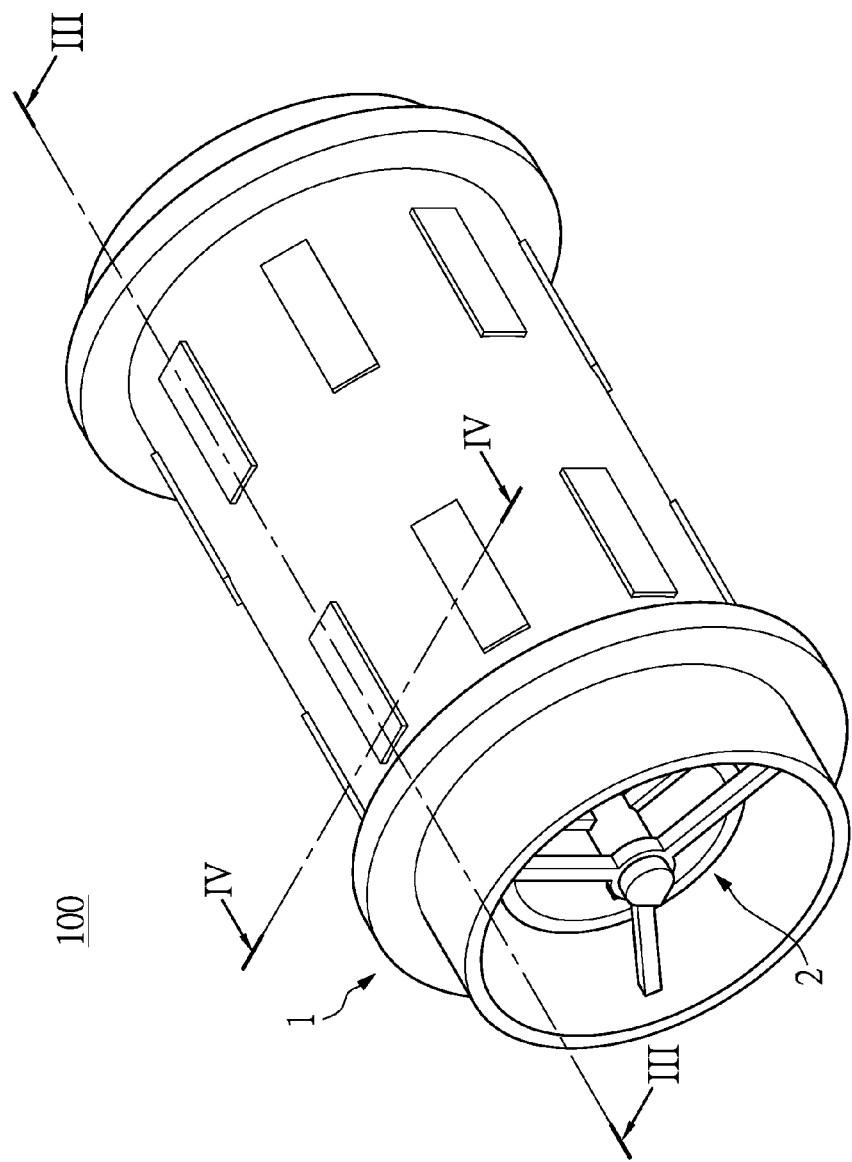
FIG. 1 is a perspective view showing a fluid electricity generation device with dual-case according to a first embodiment of the instant disclosure.

Please refer to FIG. 1, which shows a fluid electricity generation device 100 with dual-case. The fluid electricity generation device 100 in the instant embodiment is a wind electricity generation device, but is not limited thereto. The fluid electricity generation device 100 comprises a stator assembly 1 and a rotor assembly 2 installed in the stator assembly 1. The rotor assembly 2 is rotatable with respect to the stator assembly 1 for generating electricity. The following description discloses the construction of each one of the stator assembly 1 and the rotor assembly 2, and then discloses the relative features of the stator assembly 1 and the rotor assembly 2.

Figure 2:
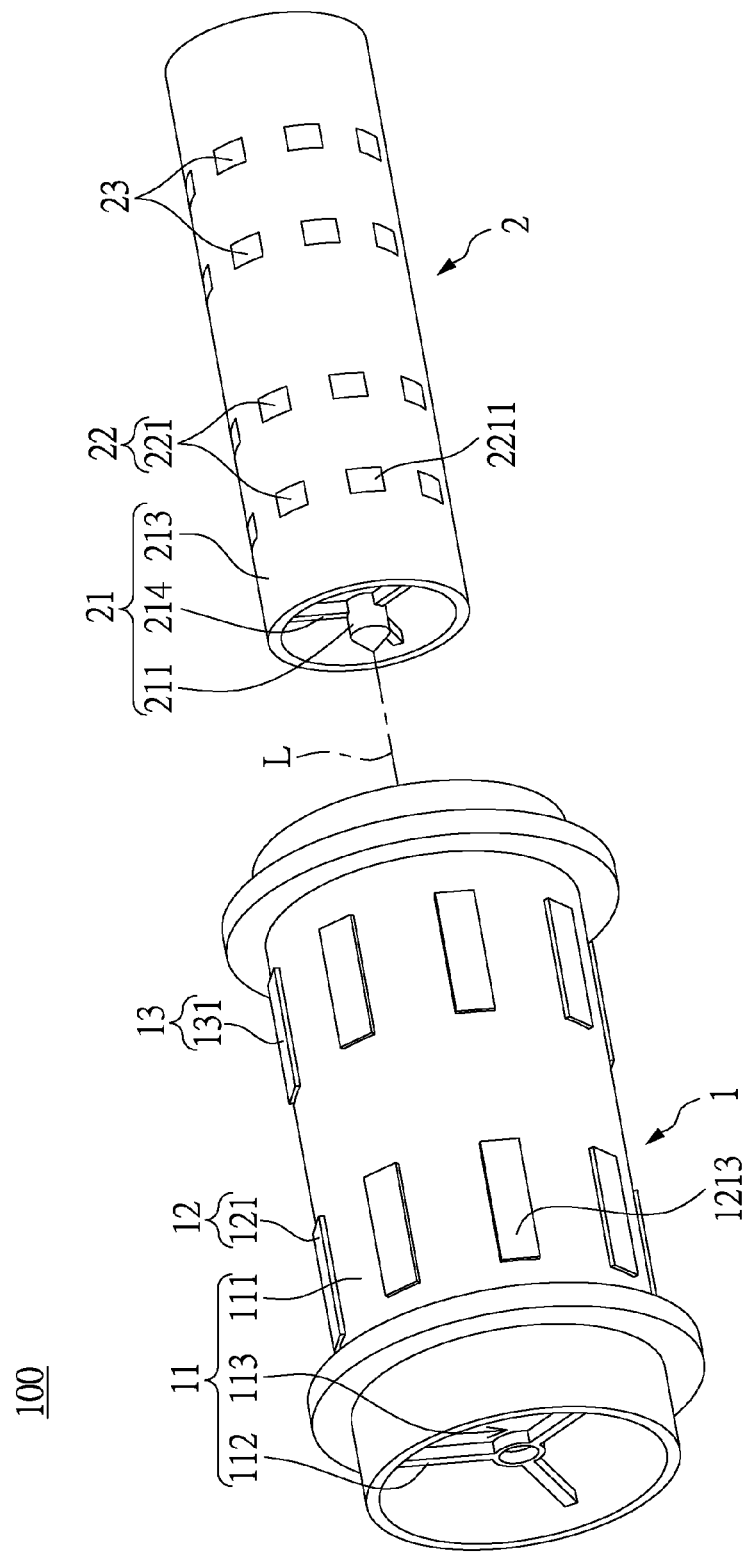
FIG. 2 is an exploded view of FIG. 1.
Figure 3:
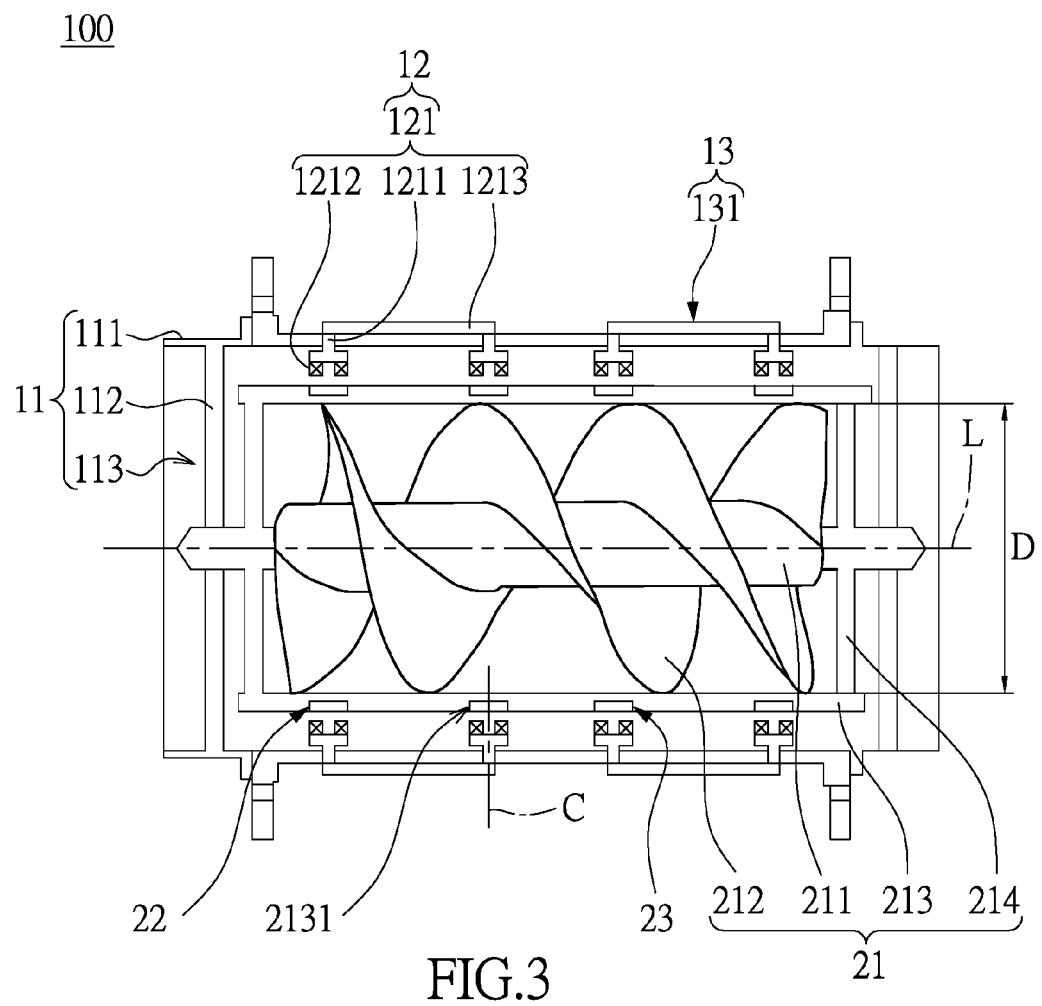
FIG. 3 is a cross-sectional view of FIG. 1 along line III-III.
Figure 4:
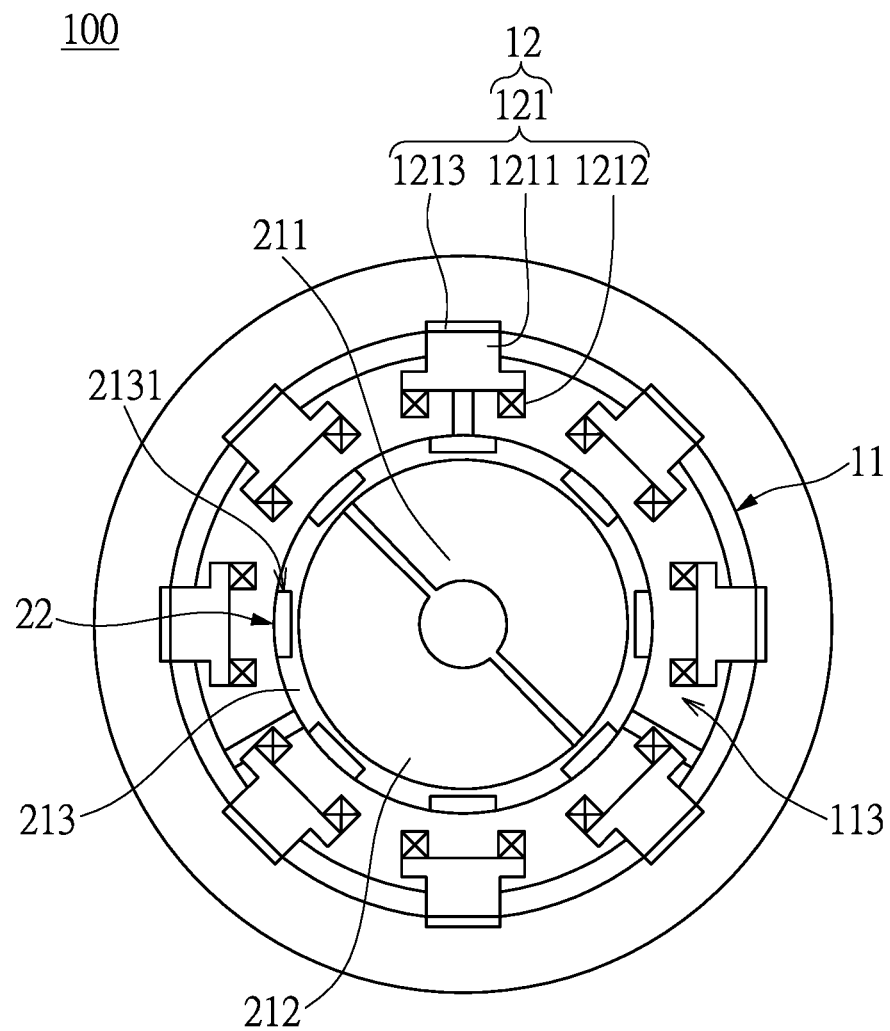
FIG. 4 is a cross-sectional view of FIG. 1 along line IV-IV.

As shown in FIGS. 2 through 4, the stator assembly 1 has an outer case 11 and a first magnetically permeable module 12 disposed on the outer case 11. The outer case 11 has an elongated tube 111 and two supporting portions 112. The tube 111 in the instant embodiment is a circular tube, and the tube 111 surroundingly defines a channel 113. Moreover, the tube 111 defines an axis L passing through the channel 113. The axis L in the instant embodiment is the centerline of the tube 111, but is not limited thereto. The two supporting portions 112 are respectively installed in two opposite portions of the tube 111 (i.e., the left and right portions of the tube 111 as shown in FIG. 3), and the construction of each supporting portion 112 is suitable to provide fluid (i.e., wind) to inflow and outflow the channel 113.

The first magnetically permeable module 12 includes a plurality of first magnetically permeable units 121. The first magnetically permeable units 121 are distributed on the tube 111. The number or the distribution of the first magnetically permeable units 121 can be adjusted according to a designer's request, and is not limited to the instant embodiment.

Specifically, as shown in FIG. 3, each first magnetically permeable unit 121 includes two magnet blocks 1211, two coils 1212 respectively disposed on ends of the magnet blocks 1211, and a magnetically connecting member 1213 (i.e., metallic material, silicon steel sheet, or iron sheet) connecting the other ends of the two magnet blocks 1211. The magnetically connecting member 1213 can integrally or detachably connect the two magnet blocks 1211, and each magnet block 1211 defines a centerline C approximately perpendicular to the axis L.

As shown in FIGS. 2 through 4, the rotor assembly 2 is rotatably arranged in the channel 113 of the outer case 11. The rotor assembly 2 includes a rotating member 21 and a first magnetic module 22 disposed on the rotating member 21, and the rotating member 21 is rotatable along the axis L. The rotating member 21 has an inner case 213, a column 211 arranged in the inner case 213, and a spiral blade 212 connected to the column 211.

The inner case 213 in the instant embodiment is an elongated circular tube, and the inner case 213 is made of magnetically permeable material or non-magnetically permeable material, but the inner case 213 is not limited to the instant embodiment. At least one accommodating trough 2131 is concavely formed on an outer surface of the inner case 213 in a radial direction perpendicular to the axis L (as shown in FIG. 3, the radial direction is substantially parallel to the centerline C), and the number of the accommodating troughs 2131 of the inner case 213 in the instant embodiment is several. Two opposite ends of the column 211 are respectively pivoted to the two supporting members 112, and the centerline of the column 211 in the instant embodiment overlaps the axis L. The length of the spiral blade 212 in the axis L is greater than the height of the spiral blade 212, which is defined by twice of a distance between an outer edge of the spiral blade 212 and the axis L. The outer edge of the spiral blade 212 arranged away from the column 211 is connected to the inner case 213, such that the inner case 213 and the spiral blade 212 are together rotatable. Moreover, the spiral blade 212 in the instant embodiment is provided without any first magnetic module 22 to reduce the processing difficulty of the rotating member 21.

In addition, the rotating member 21 can have a plurality of connecting rods 214. An end of each connecting rod 214 is connected to the column 211, and the other end of each connecting rod 214 is connected to the inner case 213, such that the inner case 213 and the spiral blade 212 are together rotatable by using the connecting rods 214. The inner case 213 in the instant embodiment can be provided to connect the outer edge of the spiral blade 212 or/and the connecting rods 214.

The rotating member 21 as shown in FIG. 3 has a single spiral blade 212 connected to the column 211 for example, but the number of the spiral blade 212 of the rotating member 21 can be changed according to a designer's request. For example, the rotating member 21 can have a plurality of spiral blades 212 connected to the column 211.

Figure 5:
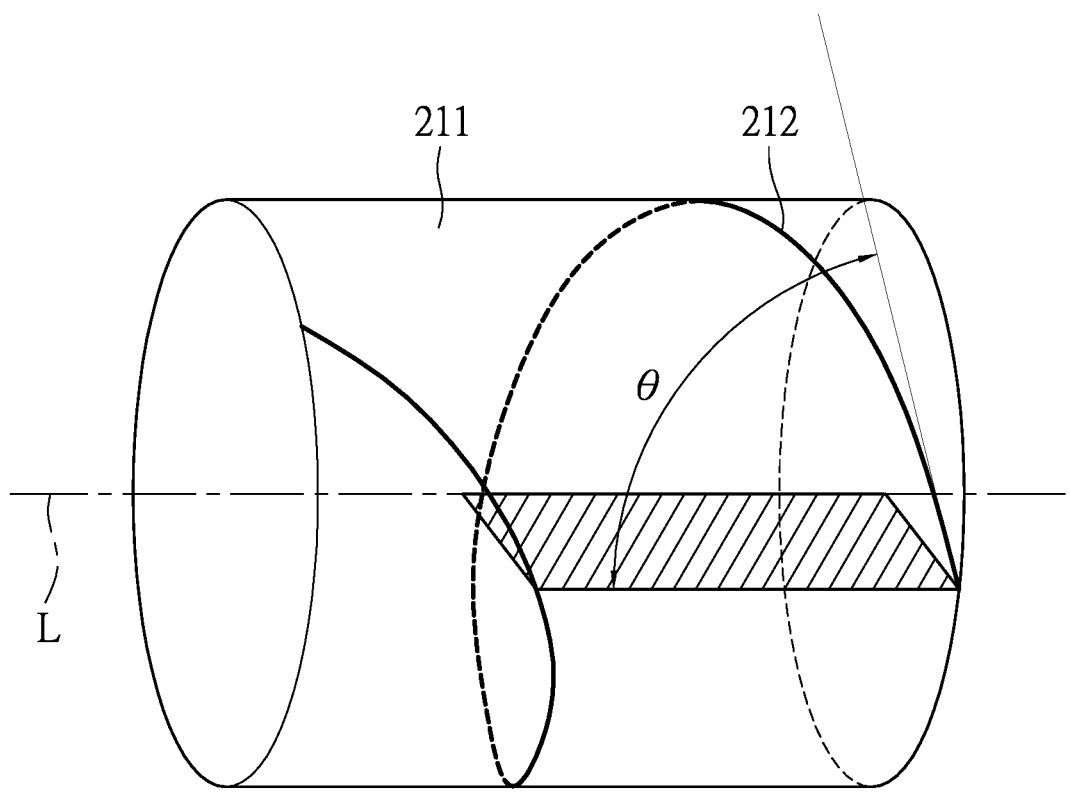
FIG. 5 is a schematic view showing the rotor assembly of the fluid electricity generation device.

Specifically, the spiral blade 212 has 0.8~1.5 pitch (e.g., 1 pitch, 1.1 pitch, or 1.2 pitch), and the spiral blade 212 is connected to an outer surface of the column 211 at a helix angle θ (as shown in FIG. 5) of 21~155 degrees. A spiral line in FIG. 5 is an inner edge of the spiral blade 212 connected to the column 211, and an angle between the axis L and a tangent of the spiral line is defined as the helix angle θ. Moreover, the length of the spiral blade 212 in the axis L is determined by the helix angle θ and the diameter of the column 211, and the instant embodiment does not limit the length of the spiral blade 212.

Figure 6:
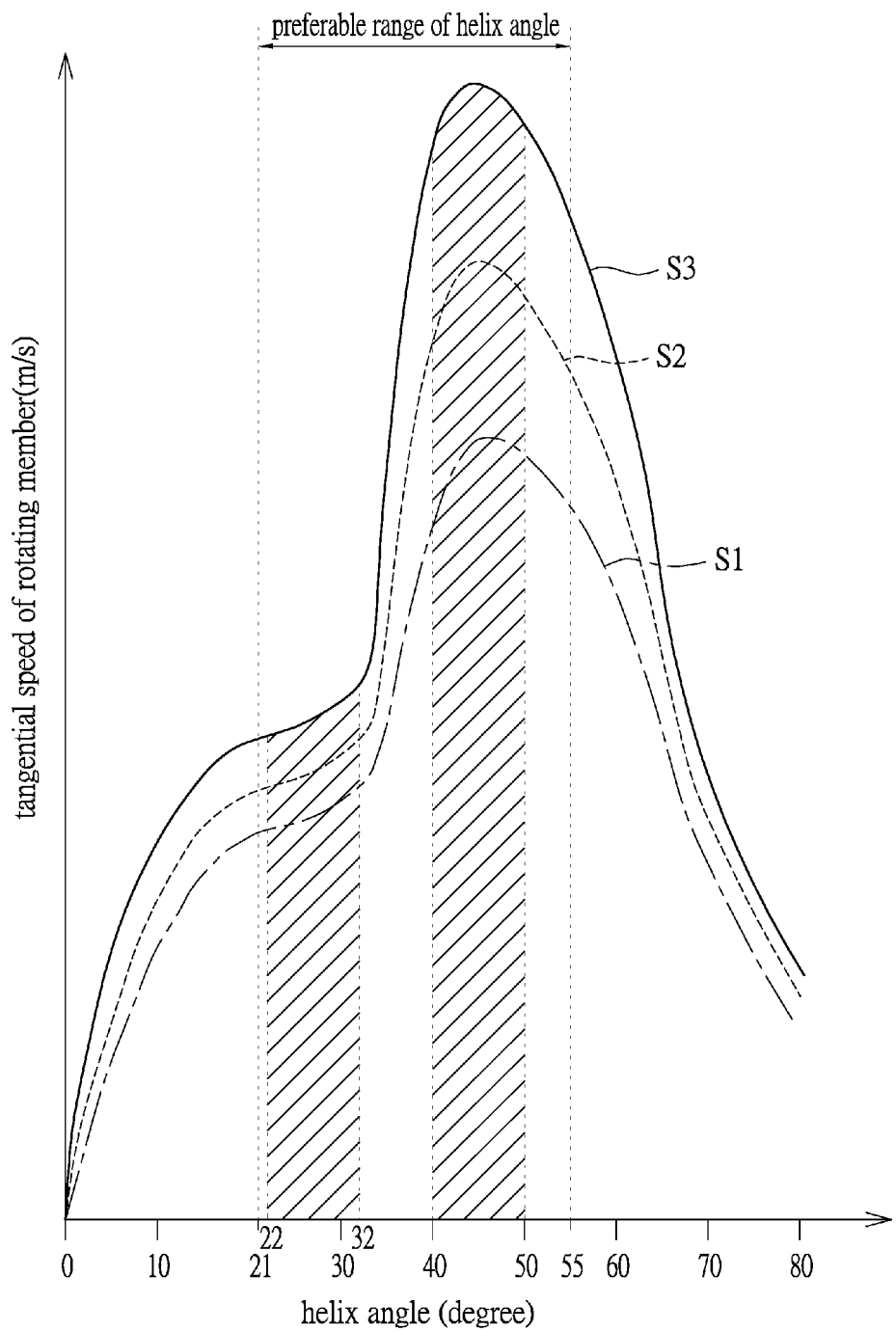
FIG. 6 is a first diagram showing a testing result, which is generated by taking a spiral angle of the spiral blade as a variable parameter to get a corresponding tangential speed of the rotating member.

FIG. 6 shows an experimental result generated by using a plurality of rotating members 21, which have the spiral blades 212 with different helix angles θ, under a specific wind velocity (e.g., curve S1 is the wind velocity of 6 m/s, curve S2 is the wind velocity of 8 m/s, curve S3 is the wind velocity of 10 m/s,). Accordingly, the rotating member 21 has a better tangential speed of the outer edge of the spiral blade 212 as the helix angle θ is 21~155 degrees, and the rotating member 21 generates chaotic wind so as to obtain less torque as the helix angle θ is not 21~155 degrees. Specifically, double of a distance between the outer edge of the spiral blade 212 and the axis L is defined as D (shown in FIG. 3), the rotating member 21 is operated at N rpm, T=1/N. Accordingly, the tangential speed in the instant embodiment means that the moving distance of the outer edge of the spiral blade 212 in per-second (i.e., $\pi$ D/60T). In other words, the tangential speed of the rotating member 21 in the instant embodiment can be converted into $\pi$ DN/60. That is to say, the tangential speed of the rotating member 21 in the instant embodiment can be presented by different unit according to the designer's demand.

Specifically, when the fluid electricity generation device 100 is applied to different environments, the spiral blade 212 should be provided with a corresponding helix angle θ for causing the fluid electricity generation device 100 to run in a better operation mode. For example, when the fluid electricity generation device 100 is disposed at a fixed location (e.g., roof) for receiving a natural wind, if the natural wind is not stable, such as a typhoon, the spiral blade 212 needs a related structure for avoiding a damage problem, which may be generated by the unstable natural wind. Moreover, when the fluid electricity generation device 100 is disposed on a moving object (e.g., vehicle) for receiving a wind, this wind is stable and predictable, so the spiral blade 212 can have a related structure for increasing the performance of the fluid electricity generation device 100.

Thus, according to many experiments, the helix angle θ of the spiral blade 212 in the unstable wind environment is preferably 22~32 degrees, which is defined as a smaller helix angle θ; the helix angle θ of the spiral blade 212 in the stable and predictable wind environment is preferably 40~50 degrees, which is defined as a bigger helix angle θ, and the spiral blade 212 has an excellent torque when the bigger helix angle θ is about 45 degrees.

Figure 7:
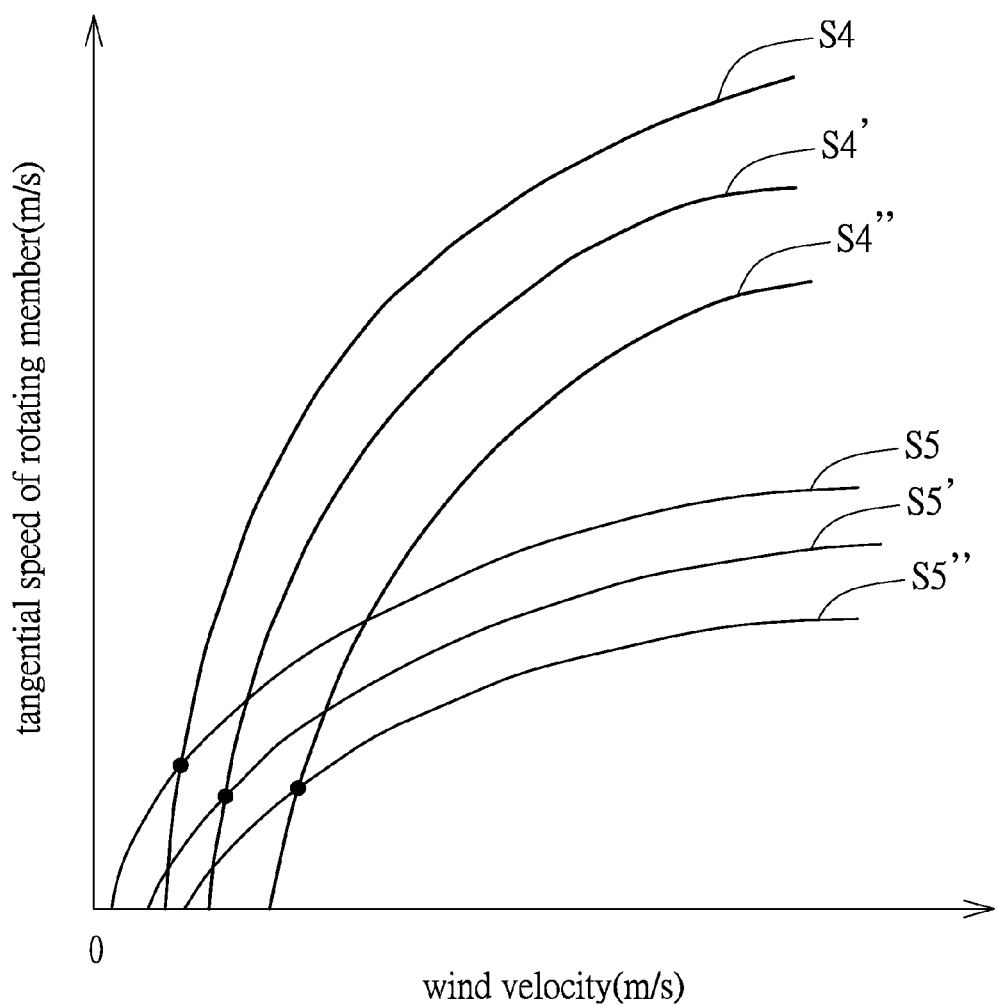
FIG. 7 is a second diagram showing a testing result, which is generated by taking wind velocity as a variable parameter to get a corresponding tangential speed of different rotating members.

FIG. 7 show an experimental result generated by using a plurality of rotating members 21, which respectively have the smaller helix angles θ and the bigger helix angles θ, under different wind velocity for confirming the above values related to the helix angles θ. When the wind velocity is greater than a specific value, the rotating members 21 having the bigger helix angles θ (i.e., the curves S4, S4', S4" shown in FIG. 7) rotate faster and faster as the wind velocity is increased, so the spiral blades 212 are easily damaged by a strong breeze (e.g., typhoon). However, when the wind velocity is greater than a specific value, the rotating members 21 having the smaller helix angles θ (i.e., the curves S5, S5', S5" shown in FIG. 7) smoothly and stably rotate as the wind velocity is increased, so the tangential speed of the rotating members 21 are not influenced by a strong breeze.

Specifically, if the rotating member 21 is provided with a different load (e.g., the load means the number of the magnetic members 221 disposed on the rotating member 21), the experimental results will be different. The load of the rotating member 21 from small to big in the bigger helix angle θ is the curve S4, the curve S4', the curve S4" shown in FIG. 7, and the load of the rotating member 21 from small to big in the smaller helix angle θ is the curve S5, the curve S5', the curve S5" shown in FIG. 7. Thus, according to different environments and practical demands, a user can choose a suitable helix angle θ and a suitable load of the rotating member 21.

Please refer to FIGS. 8 through 15, the material of the inner case 213 can be changed, and the first magnetic module 22 needs to be correspondingly changed. The following description discloses some possible constructions of the fluid electricity generation device 100.

Figure 8:
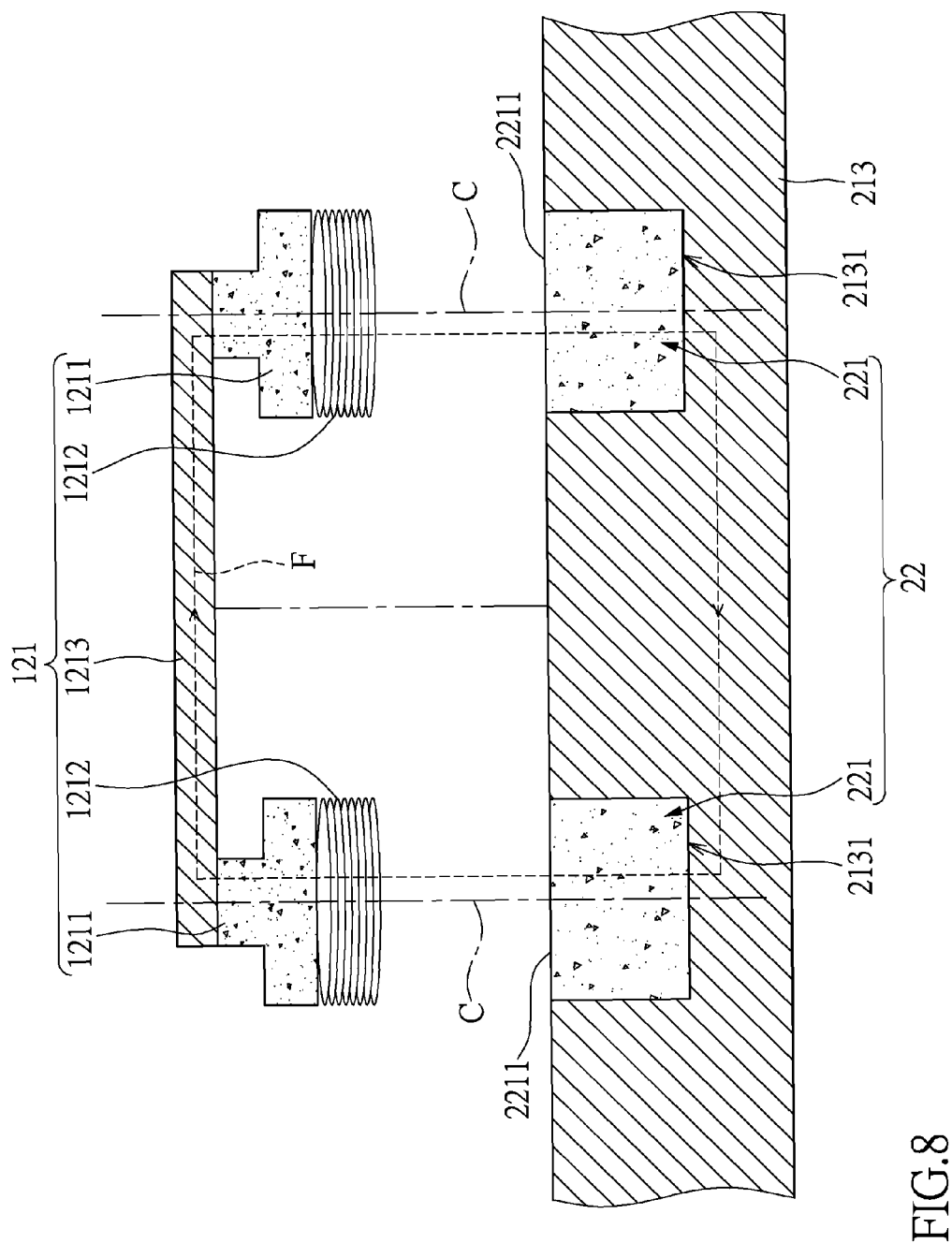
FIG. 8 is a cross-sectional view showing a first magnetic module and a corresponding first magnetically permeable unit of part of FIG. 3.
Figure 9:
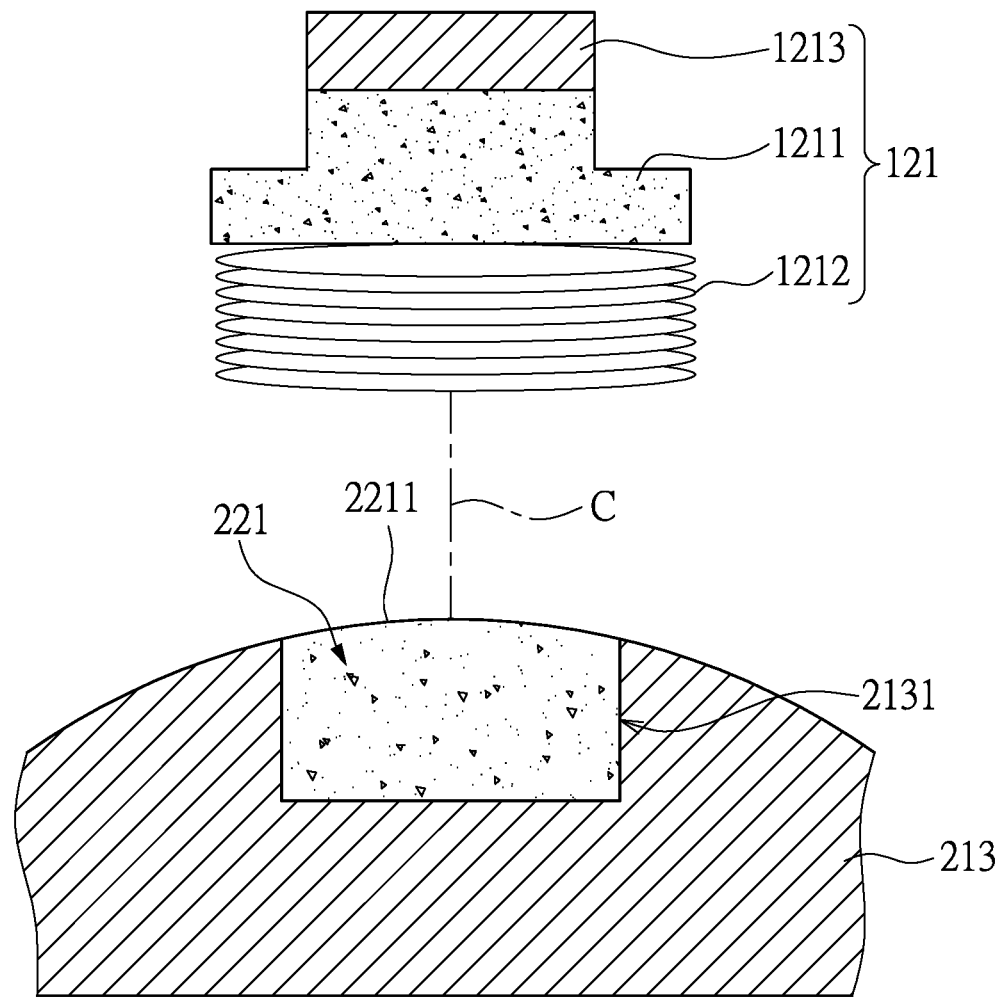
FIG. 9 is a cross-sectional view showing a first magnetic module and a corresponding first magnetically permeable unit of part of FIG. 4.

As shown in FIGS. 8 and 9, the inner case 213 is made of magnetically permeable material, the first magnetic module 22 has two magnetic members 221, and each magnetic member 221 in the instant embodiment is a magnet block (i.e., permanent magnets), but is not limited thereto. For example, the magnetic member 221 can be magnetic powders. The two magnetic members 221 of the first magnetic module 22 are respectively embedded in the two accommodating troughs 2131 of the inner case 213. Ends of the two magnetic members 221 arranged away from the column 211 are respectively defined as two magnetic ends 2211 having different polarities (e.g., the top end of the left magnetic member 221 is N pole, and the top end of the left magnetic member 221 is S pole), and one of the magnetic members 221 is configured to emit a magnetic force transmitting to the other magnetic member 221 through the inner case 213.

Thus, when the rotor assembly 2 rotates along the axis L to a predetermined position, the two magnetic ends 2211 of the first magnetic module 22 respectively face the two magnet blocks 1211 of the first magnetically permeable unit 121 in a radial direction perpendicular to the axis L, such that two kinds of magnetic forces respectively emitted from the magnetic ends 2211 travel along the first magnetic module 22, the first magnetically permeable unit 121, and the inner case 213 to form as a magnetic loop F. Specifically, a magnetic area of the first magnetic module 22 passes through the first magnetically permeable unit 121 to generate induced current. The magnetic area in the instant embodiment is defined by the magnetic field generated from the magnetic member 221 of the first magnetic module 22, so the magnetic area in the instant embodiment can be regarded as the magnetic forces emitted from the two magnetic members 221. Accordingly, the magnetic forces emitted from the two magnetic members 221 respectively pass through the two coils 1212 to generate induced current.

Figure 10:
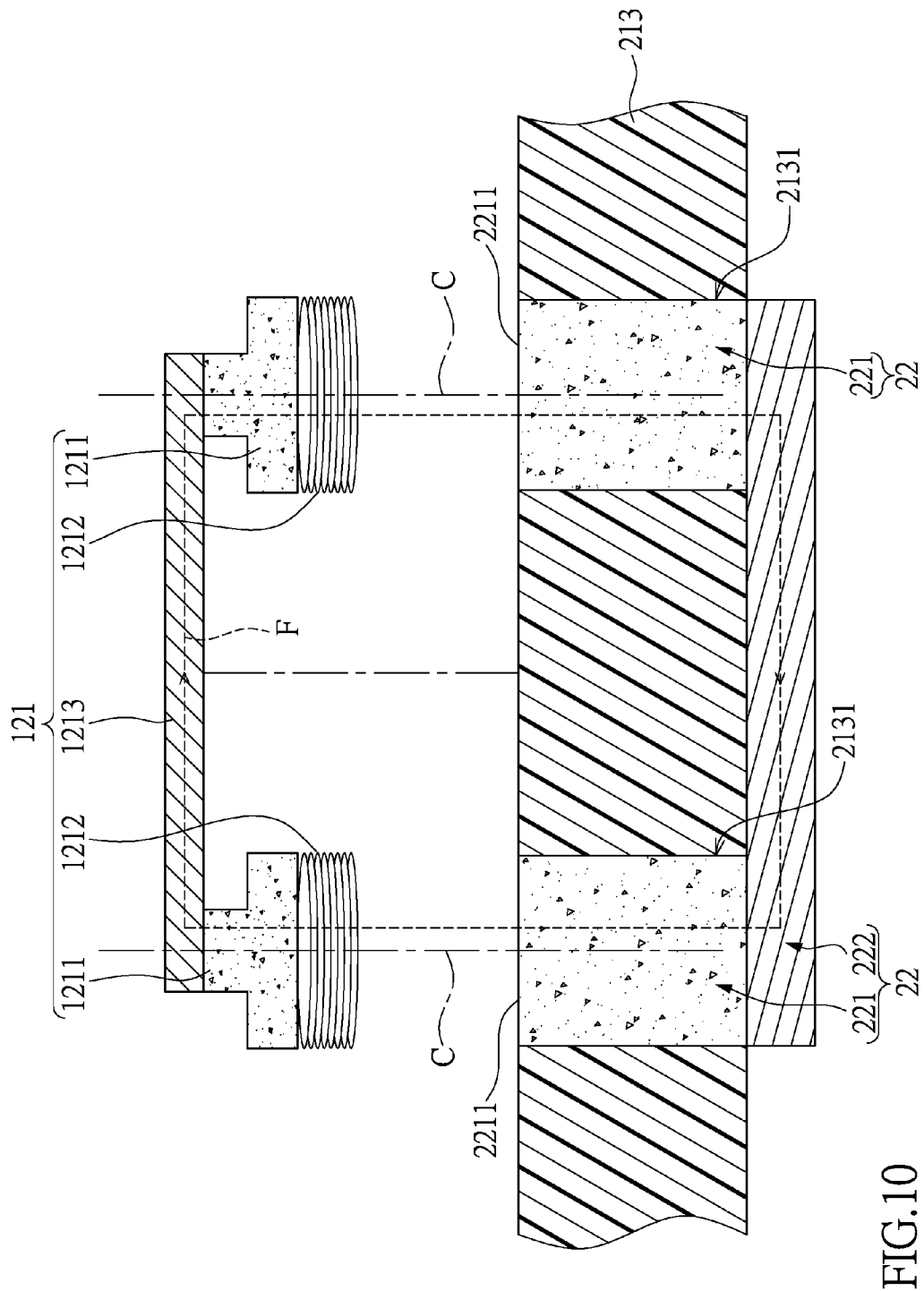
FIG. 10 is a cross-sectional view showing a first magnetic module and a corresponding first magnetically permeable unit according to a second embodiment of the instant disclosure.
Figure 11:
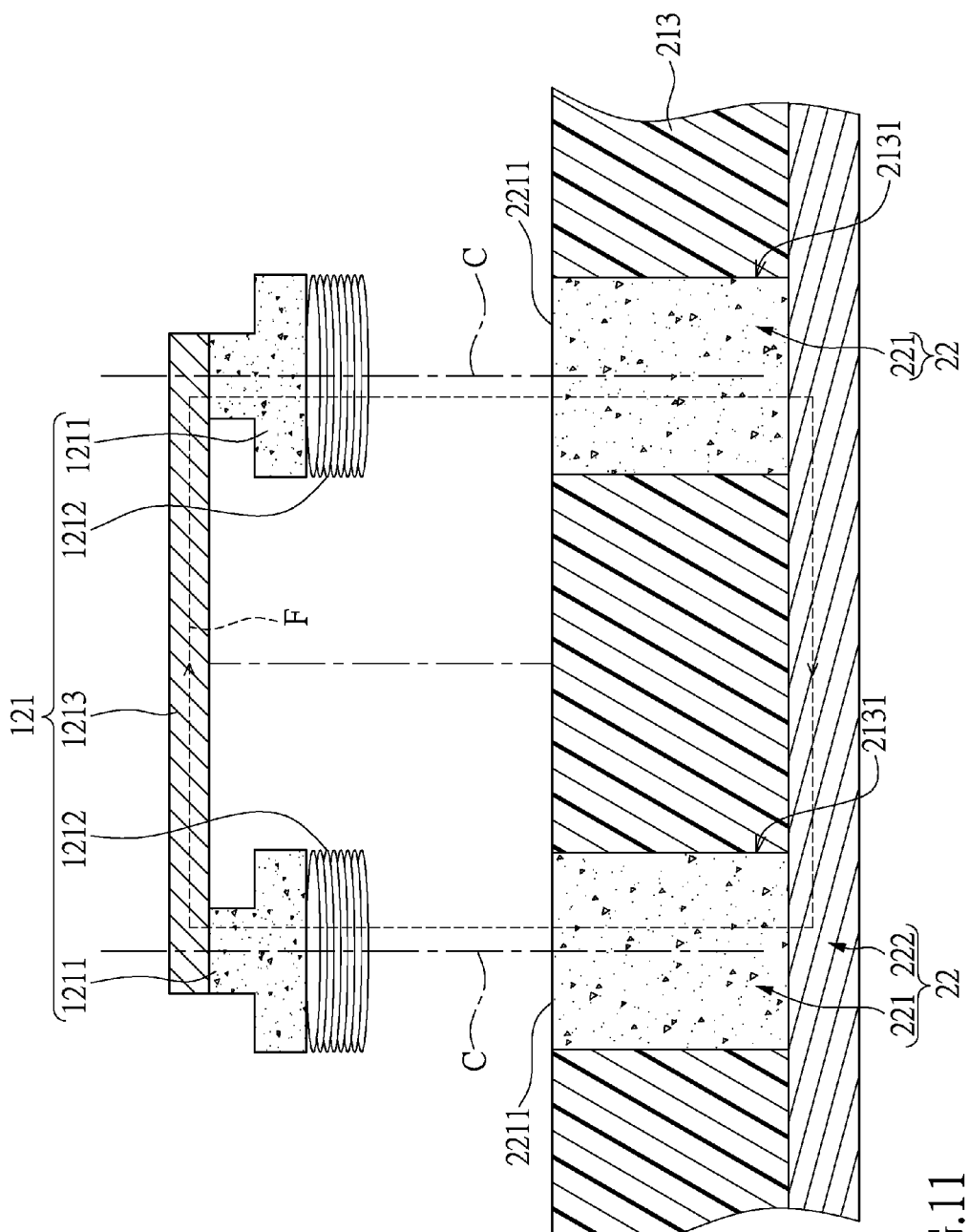
FIG. 11 is a cross-sectional view showing a first magnetic module and a corresponding first magnetically permeable unit according to a third embodiment of the instant disclosure.

Moreover, as shown in FIGS. 10 and 11, the inner case 213 is made of non-magnetically permeable material, the first magnetic module 22 has two magnet blocks 221 (i.e., permanent magnets), an elongated magnetic conductor 222 (i.e., metallic material, silicon steel plate, or metallic block). The two magnetic members 221 of the first magnetic module 22 are respectively arranged in the two accommodating troughs 2131 of the inner case 213. The magnetic conductor 222 is disposed on the inner surface of the inner case 213 and is preferably connected to the two magnetic members 221. The magnetic conductor 222 can be an elongated strip as shown in FIG. 10 or a layer disposed on the entire inner surface of the inner case 213 as shown in FIG. 11, but the instant disclosure is not limited thereto. Ends of the two magnetic members 221 arranged away from the column 211 are respectively defined as two magnetic ends 2211 having different polarities, and one of the magnetic members 221 is configured to emit a magnetic force transmitting to the other magnetic member 221 through the magnetic conductor 222.

Thus, when the rotor assembly 2 rotates along the axis L to a predetermined position, the two magnetic ends 2211 of the first magnetic module 22 respectively face the two magnet blocks 1211 of the first magnetically permeable unit 121 in a radial direction perpendicular to the axis L, such that two kinds of magnetic forces respectively emitted from the magnetic ends 2211 travel along the first magnetic module 22 and the first magnetically permeable unit 121 to form as a magnetic loop F. Specifically, a magnetic area of the first magnetic module 22 passes through the first magnetically permeable unit 121 to generate induced current. The magnetic area in the instant embodiment is defined by the magnetic field generated from the magnetic member 221 of the first magnetic module 22, so the magnetic area in the instant embodiment can be regarded as the magnetic forces emitted from the magnetic ends 2211 of the two magnetic members 221. Accordingly, the magnetic forces emitted from the magnetic ends 2211 of the two magnetic members 221 respectively pass through the two coils 1212 to generate induced current.

Please refer to FIGS. 12 through 15. The first magnetic module 22 can further include at least one position adjusting unit 223 mounted on the magnetic members 221 for moving the magnetic members 221 with respect to the inner case 213 in the radial direction. The first magnetic module 22 is arranged in the accommodating trough 2131 of the inner case 213. The at least one position adjusting unit 223 in the instant embodiment includes a spring 2231, a fixing frame 2232, and a movable frame 2233, but is not limited thereto. For example, the spring 2231 can be a compression spring, a tension spring, or the other component having elastic function.

Figure 12:
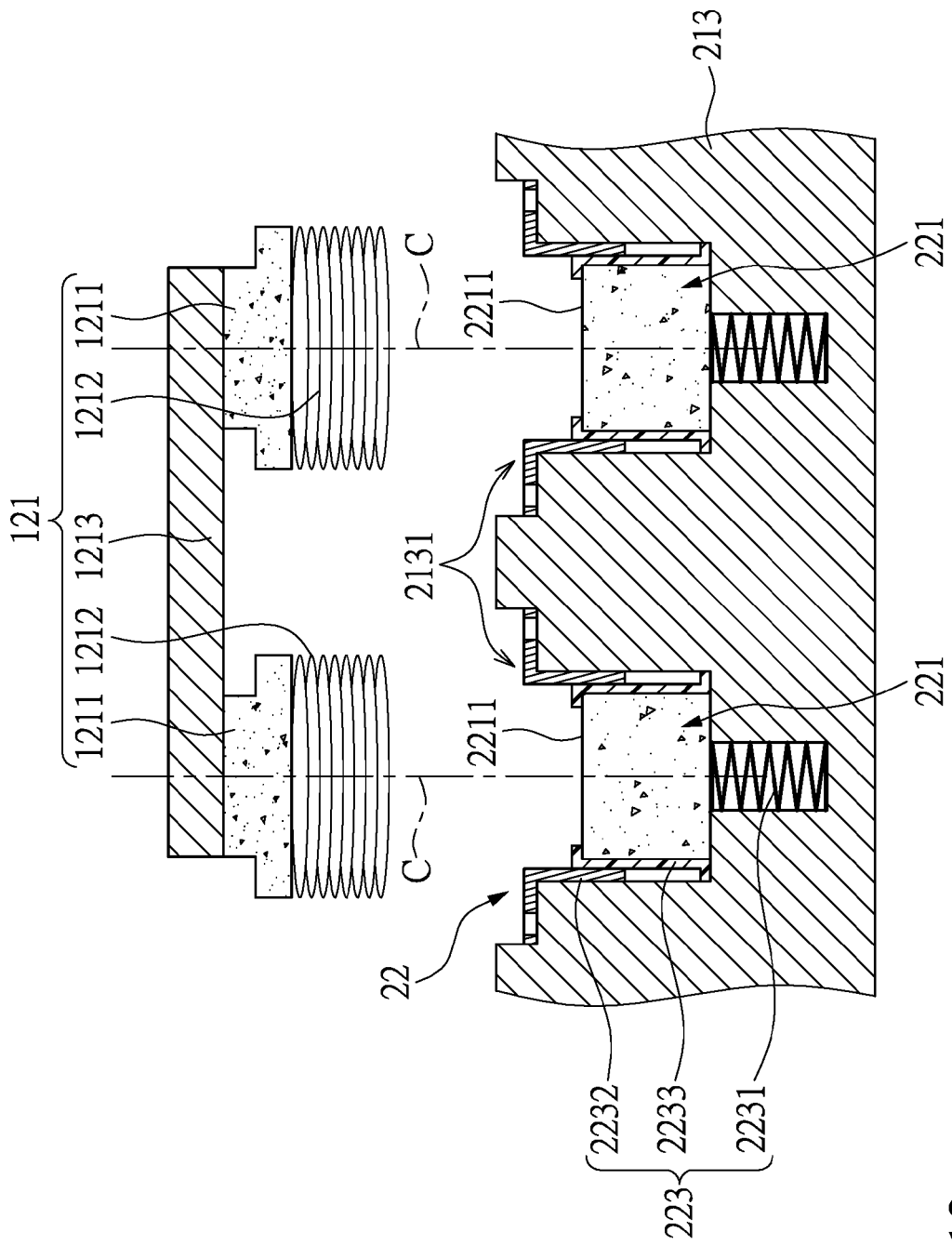
FIG. 12 is a cross-sectional view showing a first magnetic module and a corresponding first magnetically permeable unit according to a fourth embodiment of the instant disclosure.
Figure 13:
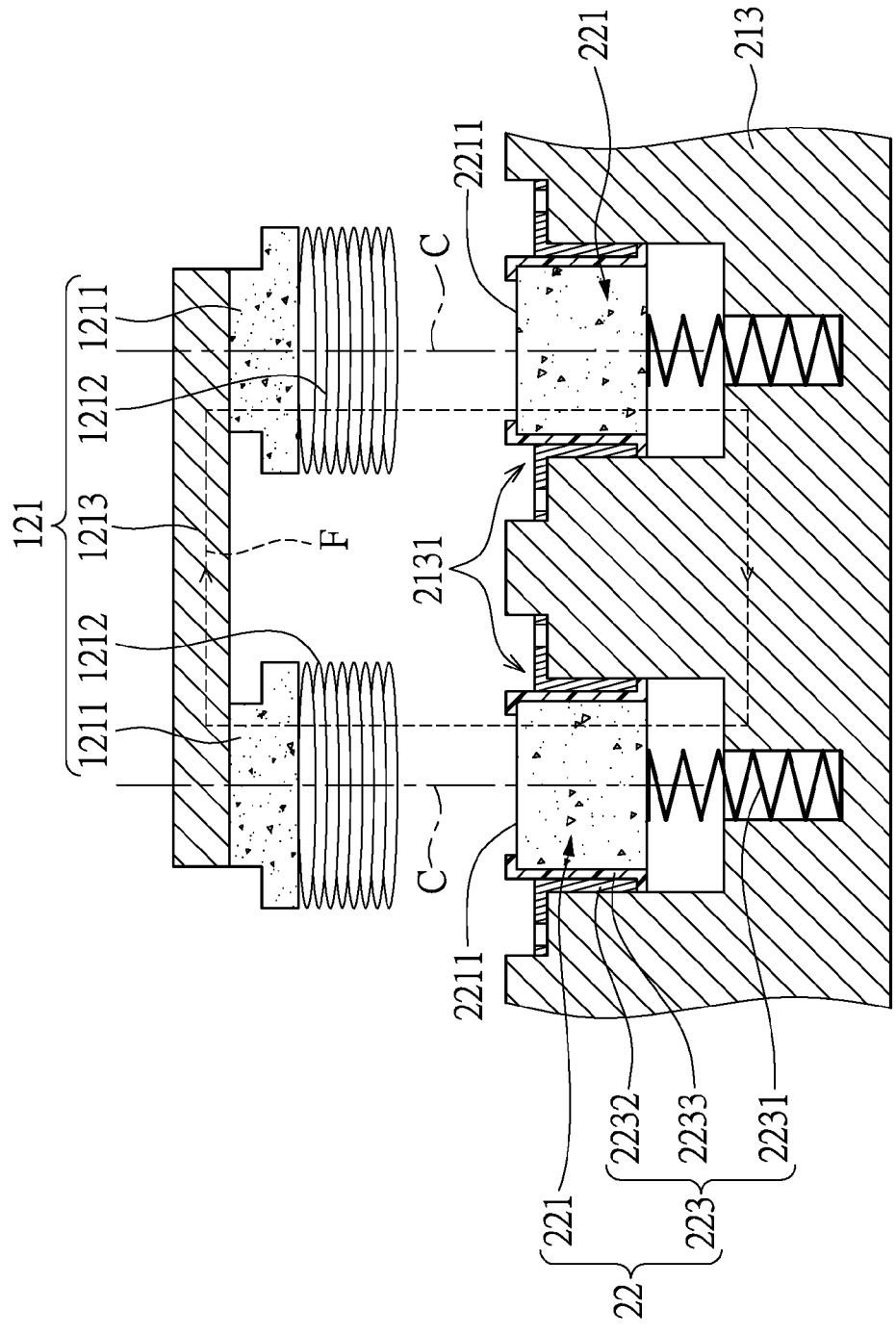
FIG. 13 is a cross-sectional view showing the first magnetic module and the corresponding first magnetically permeable unit of FIG. 12 when the rotating member is rotated.
Figure 14:
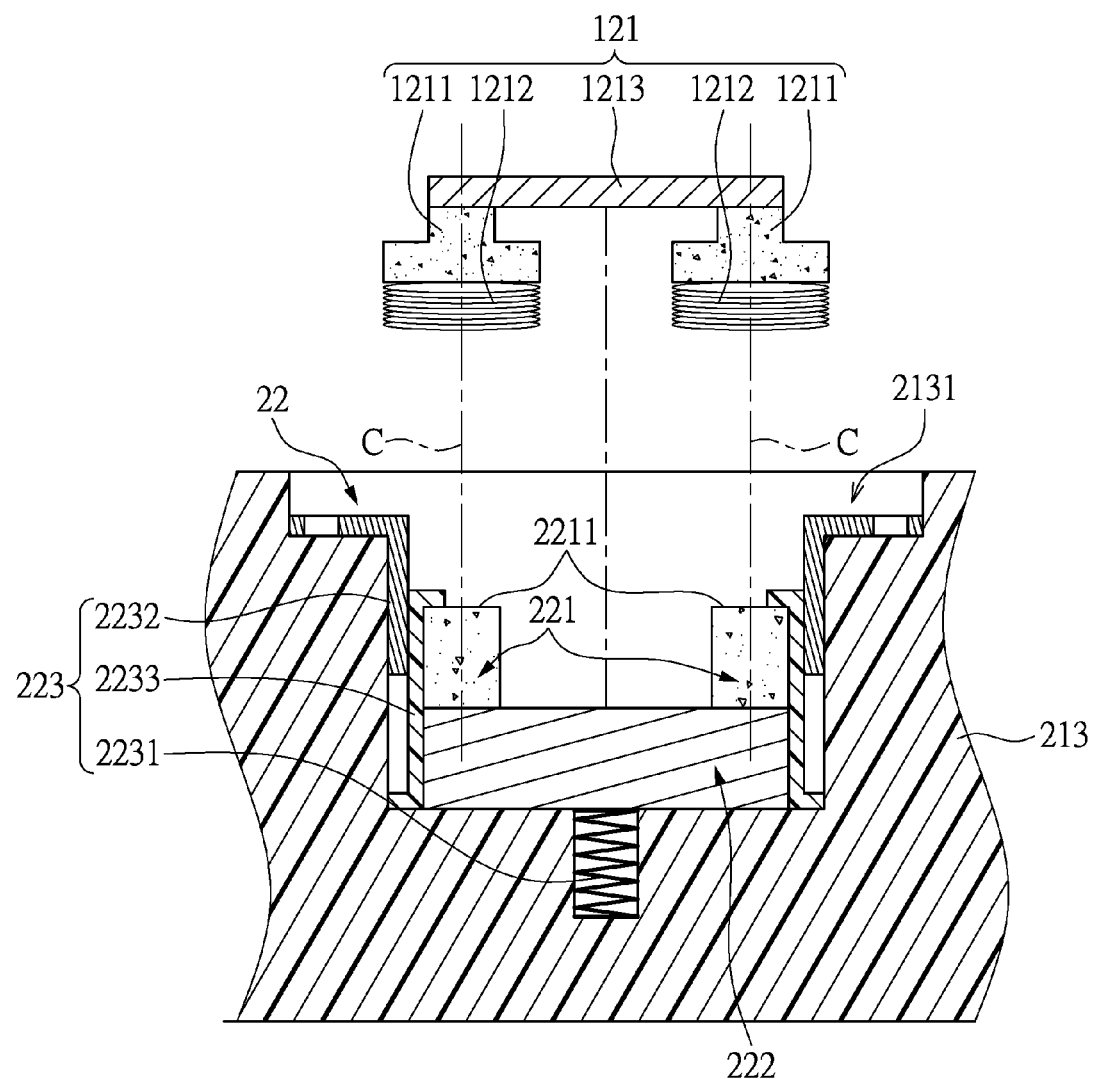
FIG. 14 is a cross-sectional view showing a first magnetic module and a corresponding first magnetically permeable unit according to a fifth embodiment of the instant disclosure.
Figure 15:
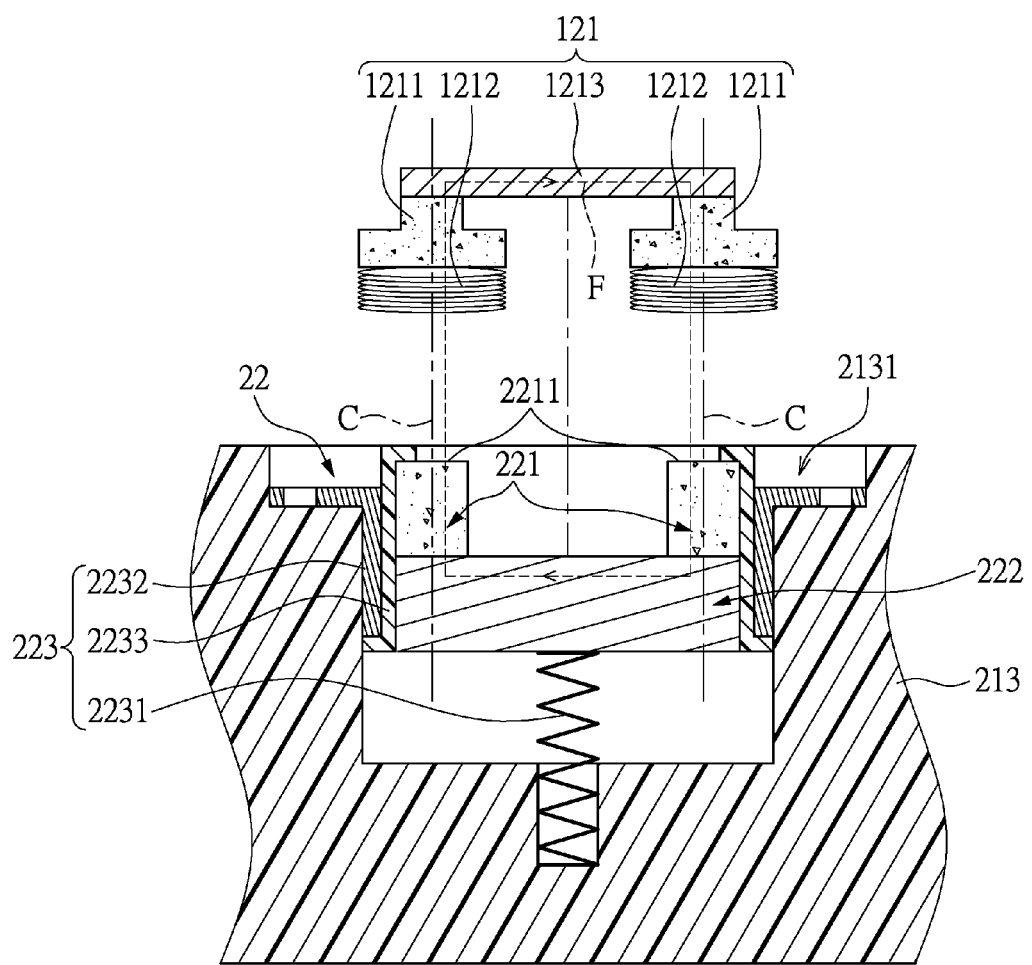
FIG. 15 is a cross-sectional view showing the first magnetic module and the corresponding first magnetically permeable unit of FIG. 14 when the rotating member is rotated.

Thus, the two magnetic members 221 of the first magnetic module 22 are configured to be driven to move from a first position (as shown in FIGS. 12 and 14) to a second position (as shown in FIGS. 13 and 15) with respect to the inner case 213 by a centrifugal force generated from the rotation of the rotating member 21, thereby causing the at least one position adjusting unit 223 to store an elastic force, which tends to move the two magnetic members 221 of the first magnetic module 22 to the first position.

For example, as shown in FIGS. 12 and 13, the first magnetic module 22 includes two position adjusting units 223. The two position adjusting units 223 are respectively arranged in the two accommodating troughs 2131 of the inner case 213. The two magnetic members 221 are respectively arranged in the two accommodating troughs 2131 of the inner case 213 and are respectively connected to the two position adjusting units 223; or, as shown in FIGS. 14 and 15, the first magnetic module 22 includes a position adjusting unit 223. The two magnetic members 221, the magnetic conductor 222, and the position adjusting unit 223 are arranged in the same accommodating trough 2131. The two magnetic members 221 are respectively connected to two opposite ends of the magnetic conductor 222.

It should be noted that the number of the first magnetic module 22 of the rotor assembly 2 is preferably several, and the magnetic members 221 are respectively arranged on two cross-sections perpendicular to the axis L. The number of the first magnetic modules 22 can be equal to the number of the first magnetically permeable units 121 of the first magnetically permeable module 12, but is not limited thereto. Moreover, the magnetic ends 2211 of the magnetic members 221 arranged on each of the cross-sections have the same polarity. Each magnetic member 221 and the corresponding (i.e., facing) magnet block 1211 are arranged on the same cross-section perpendicular to the axis L.

In addition, as shown in FIGS. 1 and 2, the stator assembly 1 in the instant embodiment can be provided with a second magnetically permeable module 13 installed on the outer case 11, and the second magnetically permeable module 13 includes a plurality of second magnetically permeable units 131. The rotor assembly 2 in the instant embodiment can be provided with a second magnetic module 23 disposed on the inner case 213 of the rotating member 21. The construction and the arrangement of the second magnetically permeable module 13 and the second magnetic module 23 are respectively identical to the construction and the arrangement of the first magnetically permeable module 12 and the first magnetic module 22, so the construction and the arrangement of the second magnetically permeable module 13 and the second magnetic module 23 are not discussed in the instant embodiment. Moreover, the inner case 213 can be divided into two partitions (not shown), the first magnetic module 22 is disposed on one of the partitions, and the second magnetic module 23 is disposed on the other partition. Accordingly, the fluid electricity generation device 100 can be further provided with a plurality of magnetic modules and corresponding magnetically permeable modules, and the inner case 213 can be divided into a plurality of partitions.

[The Possible Effect of the Instant Disclosure]

In summary, the fluid electricity generation device of the instant disclosure can increase the amount of the electricity generation by having an inner case to carry the magnetic module, which is cooperated with the corresponding first magnetically permeable unit to generate induced current when the rotor assembly rotates with respect to the stator assembly. Moreover, the fluid electricity generation device can be provided with the second magnetic module and the second magnetically permeable module, which is respectively disposed on the inner case and the outer case, for further increasing the amount of the electricity generation.

Moreover, the magnetic members can be driven to move with respect to the inner case by a centrifugal force, so when the rotating member is in a static mode, each magnetic member is arranged away from the stator assembly for reducing an obstructing force between the magnetic member and the stator assembly, such that a static driving force of the rotor assembly can be effectively reduced to allow the fluid electricity generation device to be applied to a condition or a place having low fluid velocity (i.e., low wind velocity). When the rotating member is in a rotating mode and needs to generate electricity, each magnetic member is arranged close to the stator assembly, whereby the first magnetic module and the corresponding first magnetically permeable unit can generate a magnetic loop and each magnetic member can cause the corresponding coil to generate induced current.

The descriptions illustrated supra set forth simply the preferred embodiments of the instant invention; however, the characteristics of the instant invention are by no means restricted thereto. All changes, alterations, or modifications conveniently considered by those skilled in the art are deemed to be encompassed within the scope of the instant invention delineated by the following claims.

What is claimed is:

1. A fluid electricity generation device, comprising:
a stator assembly, comprising:
an outer case, wherein the outer case surroundingly defines a channel, and the outer case defines an axis passing through the channel; and
a magnetically permeable module having at least one magnetically permeable unit disposed on the outer case; and
a rotor assembly rotatably arranged in the channel of the outer case, comprising:
a rotating member disposed in the channel of the outer case, wherein the rotating member has an inner case, a column arranged in the inner case, and a spiral blade connected to an outer surface of the column, wherein the inner case, the column, and the spiral blade are together rotatable along the axis; and
at least one magnetic module disposed on the inner case and having a magnetic area, wherein the spiral blade is configured to be driven by utilizing fluid to rotate the rotor assembly, so that the magnetic area of the magnetic module passes through the magnetically permeable unit to generate induced current,
wherein the inner case is made of non-magnetically permeable material, the magnetic module has two magnetic members and a magnetic conductor, the ends of the magnetic members arranged away from the magnetic conductor are respectively defined as two magnetic ends having different polarities, and one of the magnetic members is configured to emit a magnetic force transmitting to the other magnetic member through the magnetic conductor; wherein when the rotor assembly rotates along the axis to a predetermined position, the two magnetic ends of the magnetic module respectively face two opposite ends of the magnetically permeable unit in a radial direction perpendicular to the axis, such that two kinds of magnetic forces respectively emitted from the magnetic ends travel along the magnetic module and the magnetically permeable unit to form as a magnetic loop.

2. The fluid electricity generation device as claimed in claim 1, wherein the inner case is made of magnetically permeable material, the magnetic module has two magnetic members, the ends of the magnetic members arranged away from the column are respectively defined as two magnetic ends having different polarities, and one of the magnetic members is configured to emit a magnetic force transmitting to the other magnetic member through the inner case; wherein when the rotor assembly rotates along the axis to a predetermined position, the two magnetic ends of the magnetic module respectively face two opposite ends of the magnetically permeable unit in a radial direction perpendicular to the axis, such that two kinds of magnetic forces respectively emitted from the magnetic ends travel along the magnetic module, the magnetically permeable unit, and the inner case to form as a magnetic loop.

3. The fluid electricity generation device as claimed in claim 1, wherein each magnetic member is a magnet block, the magnetic module has at least one position adjusting unit connecting to the magnetic members, at least one accommodating trough is concavely formed on the inner case, and the position adjusting unit is arranged in the accommodating trough; wherein the magnetic members are configured to be driven to move from a first position to a second position with respect to the inner case by a centrifugal force generated from the rotation of the rotating member, thereby causing the position adjusting unit to store an elastic force, which tends to move the magnetic members to the first position.

4. The fluid electricity generation device as claimed in claim 1, wherein the magnetically permeable unit has two magnet blocks, two coils, and a magnetically connecting member, the two magnet blocks are respectively arranged at the two ends of the magnetically permeable unit, the two coils respectively disposed on ends of the two magnet blocks, and the magnetically connecting member connects the other ends of the two magnet blocks; wherein when the rotor assembly rotates to a predetermined position, the two magnetic ends of the magnetic module respectively face the two magnet blocks in the radial direction, and the magnetic forces emitted from the magnetic ends respectively pass through the two coils to generate induced current.

5. The fluid electricity generation device as claimed in claim 1, wherein the number of the magnetic module of the rotor assembly is several, the magnetic members are respectively arranged on at least two cross-sections perpendicular to the axis, and the magnetic ends of the magnetic members arranged on each of the cross-sections have the same polarity.

6. The fluid electricity generation device as claimed in claim 1, wherein an outer edge of the spiral blade arranged away from the column is connected to the inner case.

7. The fluid electricity generation device as claimed in claim 1, wherein the rotating member has a plurality of connecting rods, an end of each rod is connected to the column, and the other end of each rod is connected to the inner case.

* * * * *